United States Patent [19]

Jones

[11] 4,443,241

[45] Apr. 17, 1984

[54] METHOD OF AND APPARATUS FOR MONITORING THE CLOSING ACTION OF A MOULD

[75] Inventor: Stanley P. Jones, Tickhill, England

[73] Assignee: Emhart Industries, Inc., Farmington, Conn.

[21] Appl. No.: 432,926

[22] PCT Filed: Feb. 22, 1982

[86] PCT No.: PCT/GB82/00051

§ 371 Date: Sep. 30, 1982

§ 102(e) Date: Sep. 30, 1982

[87] PCT Pub. No.: WO82/02878

PCT Pub. Date: Sep. 2, 1982

[30] Foreign Application Priority Data

Feb. 27, 1981 [GB] United Kingdom ................ 8106178

[51] Int. Cl.³ .......................... C03B 11/16; C03B 9/40
[52] U.S. Cl. .......................................... 65/27; 65/158; 65/159; 65/164
[58] Field of Search ................... 65/159, 158, 164, 29, 65/DIG. 13

[56] References Cited

U.S. PATENT DOCUMENTS

| | | | |
|---|---|---|---|
| 3,180,718 | 4/1965 | Wilhelm | 65/158 |
| 3,192,027 | 6/1965 | Wilhelm | 65/158 |
| 3,574,587 | 4/1971 | Grundy et al. | 65/158 |
| 3,839,000 | 10/1974 | Peternel | 65/29 |
| 4,266,961 | 5/1981 | Wood | 65/158 X |

FOREIGN PATENT DOCUMENTS

| | | |
|---|---|---|
| 724103 | 1/1952 | United Kingdom . |
| 976518 | 2/1962 | United Kingdom . |
| 1343321 | 4/1971 | United Kingdom . |
| 1441099 | 6/1973 | United Kingdom . |
| 1466855 | 6/1973 | United Kingdom . |
| 1491859 | 11/1974 | United Kingdom . |
| 2003079 | 8/1978 | United Kingdom . |

OTHER PUBLICATIONS

"Electronic and Computer Control of the Heye 1-2 Glass Container Forming Machine", by H. G. Seidel, Glass Technoloby, vol. 22, No. 3, Jun. 1981, pp. 131-134.

Primary Examiner—Arthur D. Kellogg
Attorney, Agent, or Firm—Gene Warzecha

[57] ABSTRACT

A signal is produced which is representative of a position of a part of a mould (1b, 7b, 8b, 9b) at a time in a cyclic process of forming glassware when the mould (1, 7, 8, 9) should be closed. This signal is compared with a signal representative of the position of the mould part (1b, 7b, 8b, 9b) when the mould is correctly closed. This latter signal is produced by averaging a selected number of the immediately preceding signals representative of the position of the part of the mould at the time when the mould should be closed.

9 Claims, 7 Drawing Figures

METHOD OF AND APPARATUS FOR MONITORING THE CLOSING ACTION OF A MOULD

TECHNICAL FIELD

This invention is concerned with a method of monitoring the closing action of a mould of a glassware forming machine in a cyclic process of forming glassware, the method comprising producing a signal representative of the position of a part of the mould at a time in the cyclic process when the mould should be closed and comparing the signal with a signal representative of the position of the mould part when the mould is correctly closed. Accordingly, the invention is also concerned with an apparatus for use in monitoring the closing action of a mould of the cyclicly-operating glassware forming machine, the apparatus comprising a position sensitive device operable to produce a signal representative of the position of a part of the mould, producing means operable to produce a signal representative of the position of the mould part when the mould is correctly closed, and comparing means operable to compare the signals produced by the position sensitive device and the producing means at a time in the cyclic operation of the machine when the mould should be closed.

BACKGROUND ART

In the manufacture of glassware by the conventional process using an individual section (I.S.) machine, a gob of molten glass is first formed into a parison by either pressing or blowing in a blank or parison-forming mould at one station of the machine. Subsequently, the parison is blown into the final shape of the desired article of glassware in a blow mould at another station of the machine as a result of the application of air under pressure to the inside of the parison. Both moulds are formed with mould parts which are separated to permit removal of a parison or article of glassware and brought together again in a closed position of the mould for formation of the next parison or article.

In this known process, difficulties arise from time to time due to breakage of a parison at the blank station and/or breakage of a parison or an article of glassware in the blow mould. When there is breakage of either the parison or the article as aforesaid, a residue of broken glass ("cullet") can be left in the blank or blow mould and the cullet can prevent the formation of a satisfactory parison or aritcle of glassware in the succeeding cycle of a machine.

Cullet which remains in either the blank mould or the blow mould following breakage or malfunction of the parison-forming or article-shaping process in either the blank mould or the blow mould will cool and harden and may impede the closing of the parts of the blank mould or the blow mould in succeeding cycles of the machine. Unless the presence of such cullet in either the blank mould or the blow mould is quickly detected by the operator of the machine and appropriate action taken to prevent several further cycles of the machine taking place, the presence of the cooled, and therefore hard, cullet in the mould can lead to serious damage to either of the moulds when their operating mechanisms, which generate very considerable forces, attempt to close the mould parts, with a result that the machine may be put out of operation for a considerable period until replacement of the damaged mould can be undertaken. There is thus a loss of manufacturing time while the moulds are replaced and the replacement moulds brought up to the correct working temperature.

It is clearly desirable therefore to provide some means by which the malfunction leading to breakage and formation of cullet which impedes the closing of either the blank mould or the blow mould is immediately detected and action taken to prevent more than one further cycle of operation taking place in at least that mould where the malfunction has occurred.

DISCLOSURE OF INVENTION

In a method of monitoring the closure action of a mould in accordance with the invention, the signal representative of the position of the mould part when the mould part is closed is produced by averaging a selected number of the immediately preceding signals representative of a position of the part of the mould at the time when the mould should be closed.

In an apparatus for use in monitoring the closing action of a mould in accordance with the invention, the producing means produces its signal by averaging a selected number of immediately preceding signals of the position sensitive device.

The use for comparison of the average of a selected number of immediately preceding signals enables account to be taken of the change in the correct position of the mould parts when the mould is correctly closed. Such changes occur as the mould becomes worn and as the temperature of the mould increases at the beginning of its period of use. This arrangement removes the necessity for adjusting the position sensitive device during the operation of the machine. Furthermore, the position sensitive device does not require adjustment when the mould is changed for one of a different type for the manufacture of a different article.

In the event that the signals of the position sensitive device and the producing means are not within a predetermined tolerance of one another the comparing means is operative to produce an emergency action signal. This emergency action signal may be an optical or audible warning to an operator of the machine of a malfunction or the machine may comprise preventing means which is operative, when an emergency action signal is produced, to prevent formation of further articles of glassware automatically.

Preferably the position sensitive device is only operable to produce a signal when the mould part is within a predetermined tolerance of its position when the mould is correctly closed. The position sensitive device may be a linear variable transformer having a movable core of ferromagnetic material movable between two sensitive coils. The core may comprise a section of ferromagnetic material located between two sections of non-ferromagnetic material.

Preferably the producing means produces its signal by averaging the immediately previous ten signals of the position sensitive device, or, if there are less than ten such signals, by averaging all the previous signals of the device.

Conveniently the position sensitive device is located between drive means of the glassware forming machine operable to close the mould and equalising means of the glassware forming machine operable to equalise the mould closing forces between a plurality of moulds of the machine.

By comparing the determined position of a part of a mould in the closed position of the mould with the average of a selected number of immediately preceding determinations of the position of that part, apparatus in accordance with the invention overcomes the difficulty that a satisfactory closed position for that part of the mould may vary during the running of the machine in the continuous process of glassware forming. In particular, the satisfactory closed position will change during the early part of the process when the apparatus is warming up, so that the mould part will, during the preliminary stage of the process, adopt closed positions different from the closed positions which they will adopt when the whole apparatus has settled to a standard running temperature. Also, variations will occur in the standard running temperature during continuous operation of the machine and lead to slight changes in the correct closed operating position of the mould parts. Similarly, changes in the closed position of the mould parts will result from natural wear in the parts and in their operating mechanisms.

Provided that the glassware forming machine is operating satisfactorily, changes in the correct closed position of the mould parts will be gradual and apparatus according to the invention will not result in emergency action being taken. However, should a malfunction leading to the formation of cullet which impedes the closing action of the mould occur, the determined position of the mould parts in the next closing operation of the parts will differ significantly from the average of the immediately preceding determinations. This circumstance is detected by the apparatus, with the result that emergency action can be taken to determine the cause of the malfunction and to effect any necessary remedial action.

BRIEF DESCRIPTION OF DRAWINGS

In the accompanying drawings

BEST MODE OF CARRYING OUT THE INVENTION

Figure 1:
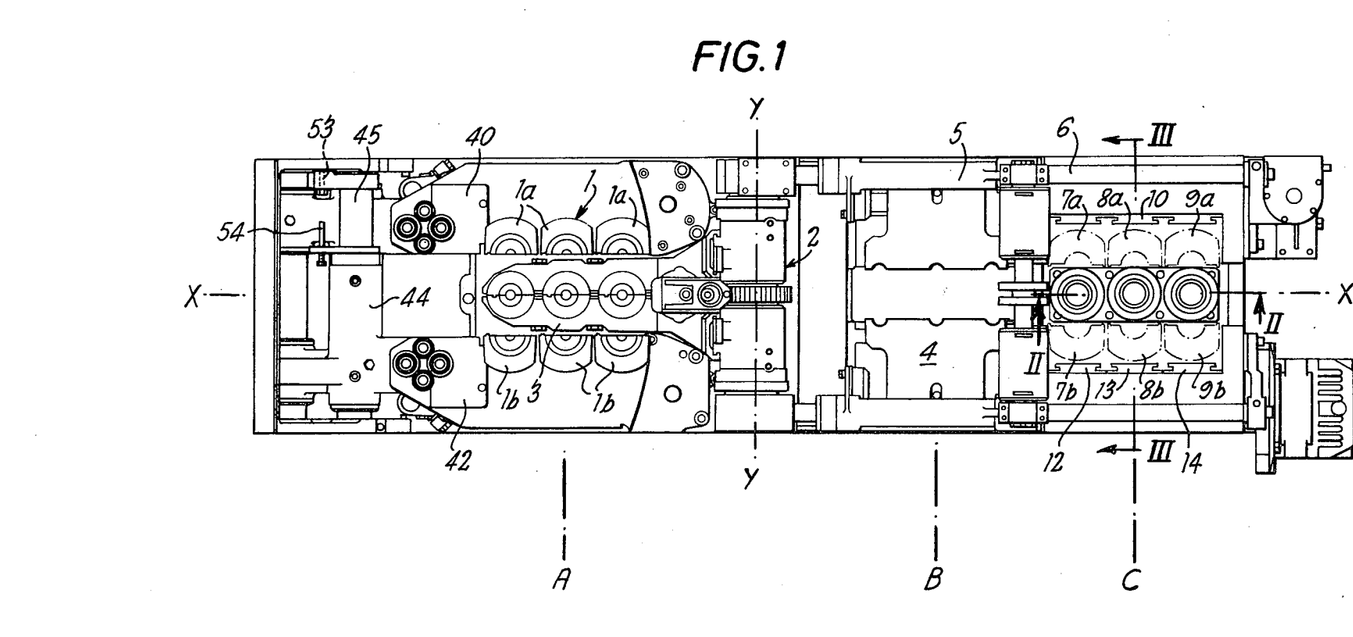
FIG. 1 is a diagrammatic plan view of a glassware forming machine, parts of which have been omitted for clarity.

The machine shown in FIG. 1 is a glassware forming machine of the individual section type. The machine is arranged to form three articles of glassware simultaneously. Gobs of molten glass are fed to three blank moulds 1 (shown open in FIG. 1) at a blank station A where the gobs are formed into parisons in a inverted position. A transfer and invert mechanism 2 moves the three parisons formed at the blank station A to an intermediate reheating station B. The mechanism 2 is rotatable about a transverse horizontal axis Y—Y, a neck ring arm 3 of the mechanism 2 swinging through 180° to transfer the parisons from the station A to the station B in a conventional manner. At the intermediate station B, the parisons are received in an upright position by support jaws 4 of a transfer carriage 5 which is horizontally movable along spaced guide rails 6 between the intermediate reheating station B and a blow station C of the machine. The parisons are formed into articles of glassware at the blow station C, being removed from the blow station C by take-out means (not shown).

In FIG. 1, the three blow moulds at the blow station C are shown in their open positions. Each blow mould includes two blow mould halves 7a, 7b; 8a, 8b; 9a, 9b which come together on the central longitudinal axis X—X of the machine when the blow moulds close. The three blow mould halves 7a, 8a, 9a are carried by a common mould carrier 10 whereas the three blow mould halves 7b, 8b, 9b are carried by individual mould carriers 12, 13, and 14. The mould carriers 10, 12, 13, 14 are guided for movement at right angles to the longitudinal axis X—X of the machine to effect opening and closing of all three moulds at the blow station C.

Figure 2:
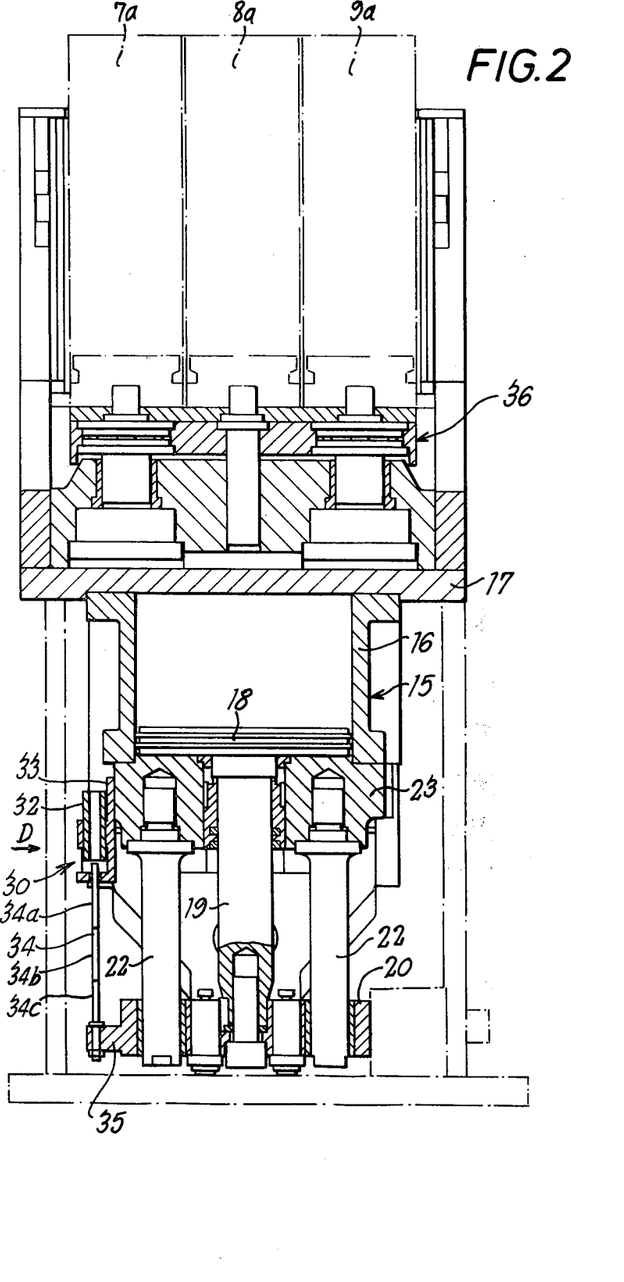
FIG. 2 is an enlarged fragmentary sectional view, taken on the line II—II of FIG. 1, showing apparatus in accordance with the invention applied to blow moulds at the blow station of the machine.
Figure 2A:
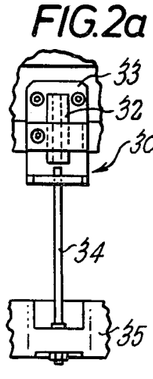
FIG. 2a is a fragmentary view looking in the direction of the arrow D in FIG. 2.
Figure 3:
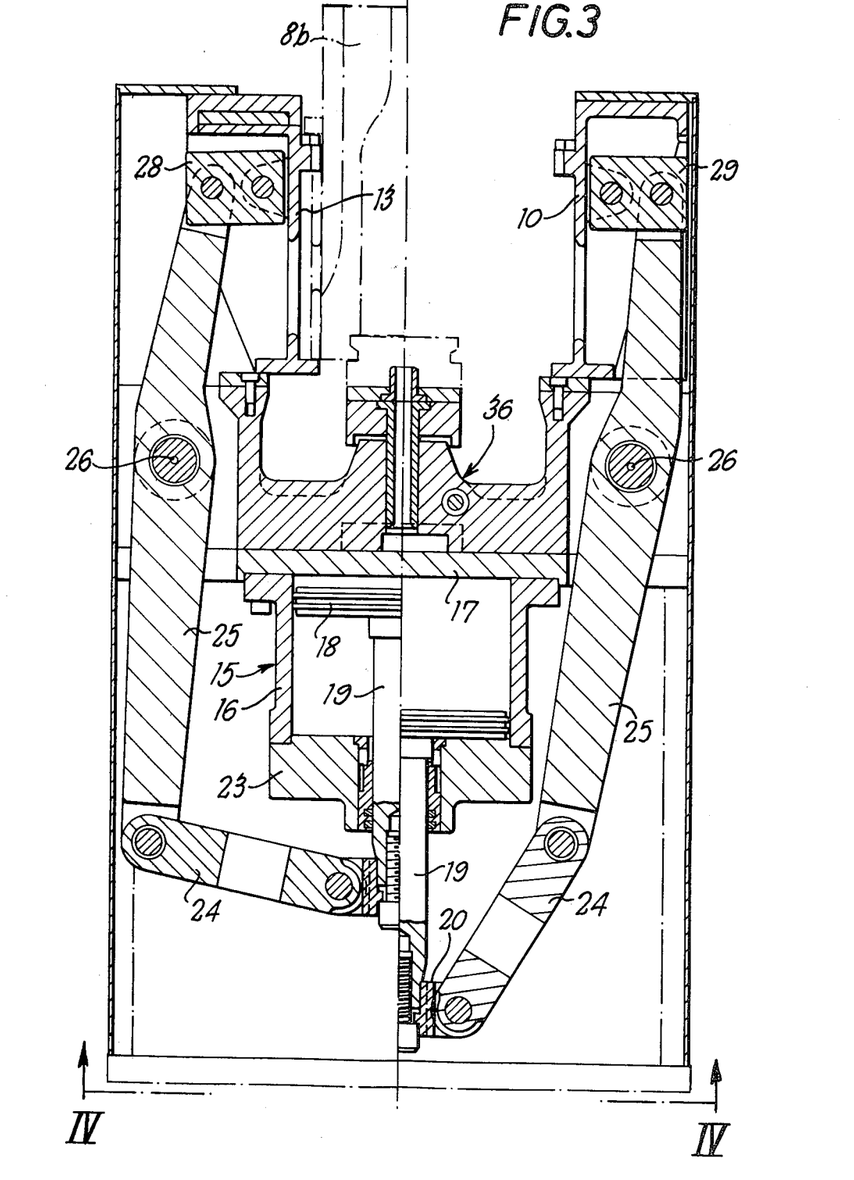
FIG. 3 is an enlarged fragmentary sectional view, taken on the line III—III of FIG. 1, the left-hand half of the drawing showing the parts in the positions they occupy when the blow moulds are closed and the right-hand half of the drawing showing the parts in the positions they occupy when the blow moulds are open.
Figure 4:
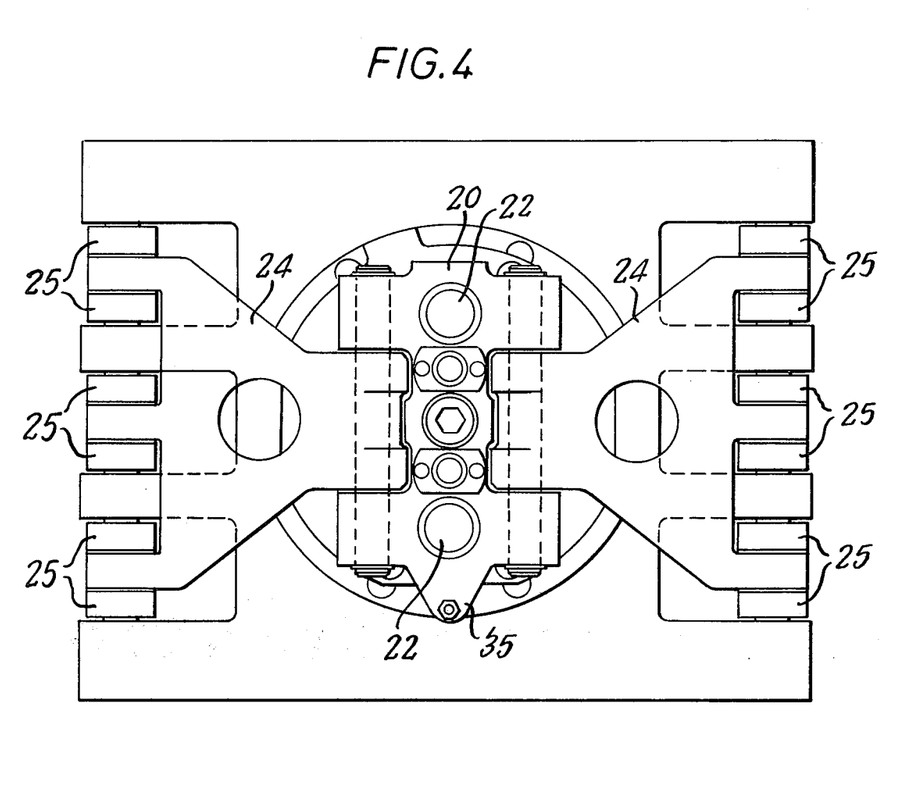
FIG. 4 is an underneath view, looking in the direction of the arrows IV—IV in FIG. 3.

A pneumatic piston and cylinder device 15 (FIGS. 2 and 3) provides drive means of the machine operable to close the moulds. The cylinder 16 of the device 15 is attached to the underside of a fixed member 17 forming part of the frame of the machine and the piston 18 of the device 15 is attached to a downwardly extending piston rod 19. The lower end of the piston rod 19 is attached to a crosshead 20 (see also FIG. 4) which is guided for vertical movement by means of two spaced vertical guides 22 (FIG. 2) which depend from a block 23 secured to the underside of the cylinder 16. As best shown in FIG. 3, one side of the crosshead 20 is attached to the mould carrier 10 while the other side of the crosshead 20 is attached to the three mould carriers 12, 13, 14, the attachment being by means of two linkages. Each of the linkages comprises a shorter link 24 and three longer links 25 which are pivotally mounted about a horizontal axis 26. The lowwer ends of the three longer links 25 of each linkage are visible in FIG. 4.

The three longer links 25 of the left-hand linkage (viewing FIGS. 3 and 4) are connected to the mould carriers 12, 13, 14 by bearing blocks, the central one of which is shown at 28 in FIG. 3. The longer links 25 of the right-hand linkage are connected to the common mould carrier by respective bearing blocks, the central one of which is shown at 29. The left-hand linkage includes equalising means (not shown) operable to equalise the mould closing forces between the three mould carriers 12, 13, 14.

As the piston 18 moves in the cylinder 16, the links 24 and 25 pivot between the positions shown on the left-hand and right-hand side of FIG. 3 to effect opening and closing movement of the blow moulds at the blow station C. Movement of the crosshead 20 with respect to the block 23, and therefore movement of the blow mould halves, is sensed by means of a position sensing device in the form of a linear variable differential transformer 30 (FIG. 2). The transformer 30 is a commercially available component and comprises a body 32 which is secured by means of a mounting bracket 33 to the block 23 and is therefore stationary. The transformer 30 also includes a core 34 which is attached to a lateral extension 35 of the crosshead 20 and is therefore movable in a vertical direction. The body 32 of the transformer 30 accommodates an energising coil and two sensitive coils. The core 34 of the transformer is in three sections which are screwed together one to the next, the sections being an intermediate section 34b of a ferromagnetic material and two end sections 34a and 34c of a non-ferromagnetic material such as stainless steel. The difference between the voltages induced in the transformer sensing coils by the core 34 is dependent upon the position of the ferromagnetic section of the core 34 with respect to the body 32 of the transformer 30. Hence, the difference voltage sensed by the transformer 30 is representative of the position of the blow mould halves 7b, 8b, 9b. As can be seen from FIG. 2, when the blow moulds are fully open the ferromagnetic section of the core 34 is wholly outside the body of the transformer 30. In the fully closed condition of the blow moulds the ferromagnetic section of the core 34 lies wholly within the body 32 of the transformer 30. It will be apparent, that the transformer 30 is located between the piston and cylinder device 15 and the linkages 24, 25.

The electrical signals from the body 32 of the transformer 30 are fed to a computer which controls the cyclic functions of a complete glassware forming machine. The computer acts to sample the electrical signal from the transformer 30 at a time in the cyclic operation of the machine when the mould should be closed. The computer does this in each cycle of operation of the machine so that a series of signals is received. This series of signals is used to provide an up-dated average signal in the following manner. As each signal is freshly sampled from the transformer 30, this signal is compared with the average of the ten immediately preceding signals held in an arithmetic storage unit of the computer. It will be appreciated that a number other than ten may be selected. Provided that the newly sampled signal lies sufficiently close to the calculated average to lie within a predetermined tolerance from this average, the computer allows the machine cycle to continue. The computer then discards the first of the ten signals and the freshly sampled signal is included with the remaining nine signals to provide a fresh average with which the next sampled signal from the transformer 30 is compared. If a signal sample from the transformer 30 lies outside the limits or range of acceptability, i.e. outside the up-dated average with a plus and minus tolerance, emergency action is initiated by the computer. The emergency action could, for example, involve stopping the blow side of the machine, thereby preventing formation of further articles of glassware, while leaving the blank side to operate so that parisons delivered to the intermediate station B are dropped as cullet at the station B and are not transferred to the transfer carriage 5. The emergency action also comprises the production of a emergency action signal in the form of a flashing light, or other optical or audible signal, which warns the operator of the machine that a malfunction has occurred. The computer, thus, comprises producing means operable to produce a signal representative of the position of the mould part when the mould is correctly closed by averaging a selected number of immediately preceding signals of the transformer 30, and comparing means operable to compare the signals produced by the transformer 30 and the up-dated average at a time in the cyclic operation of the machine when the mould should be closed.

When the machine is started, or when the blow side is restarted, any prior up-dated average is removed from the arithmetic storage unit of the computer and a new average is developed in an accumulative manner. That is to say, the first signal sample from the transformer 30 is stored in the arithmetic unit and the second sample signal is compared with the first. Assuming that the second sampled signal lies within the range of acceptability, the computer computes an average of the first and second sample signals and this average is used as the basis of comparison for the third sampled signal, and so on until the eleventh sampled signal when the computer discards the first sampled signal and thereafter maintains an updated average using the ten immediately preceding sampled signals in the manner previously described. Thus, the previous ten signals are averaged unless there are less than ten such signals in which case all the previous signals are averaged.

FIG. 2 shows the bottom plate and associated structure 36 by which suction is applied to the blow moulds at the station C. This structure 36 is not described in detail as it is unimportant to the invention disclosed herein.

Figure 5:
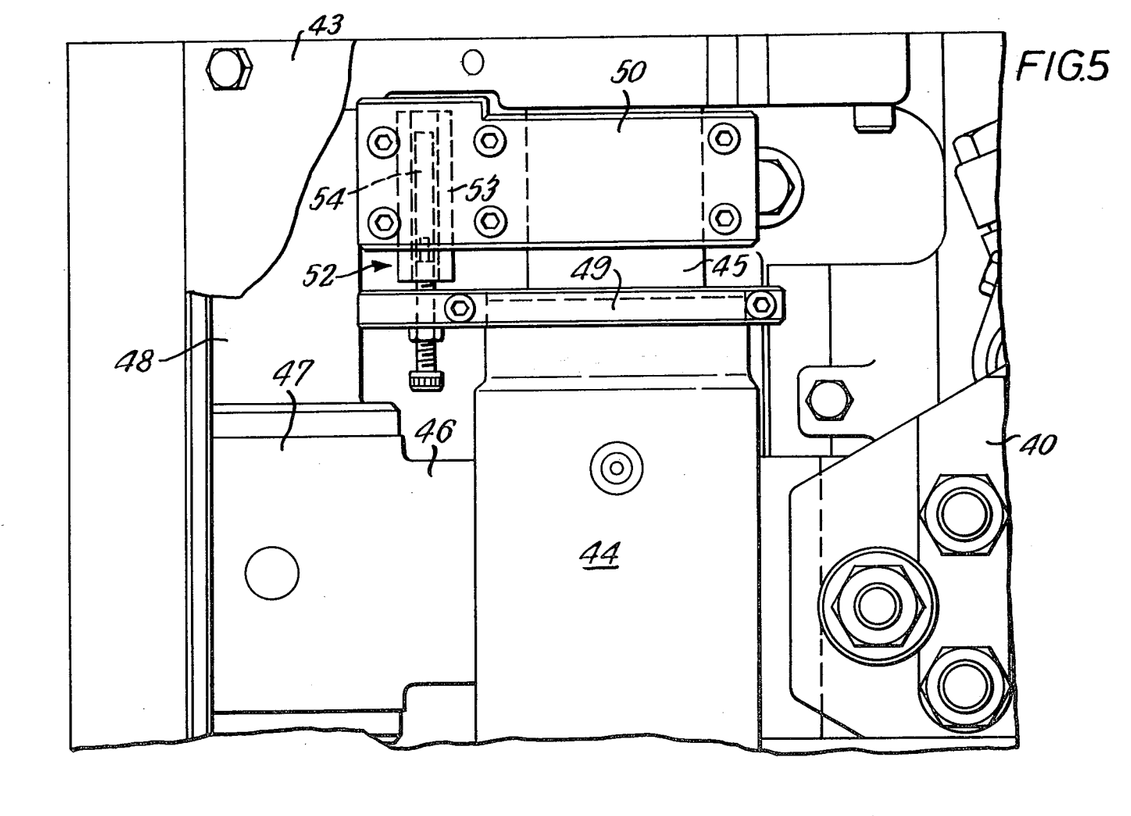
FIG. 5 is an enlarged plan view of the left-hand end of FIG. 1, showing how the invention is applied to the blank moulds at a blank station of the machine.

FIG. 5 shows how the invention may be used to monitor the closing action of the blank moulds 1 at the blank station A. Each of the three blank mould halves 1a on one side of the central longitudinal axis X—X of the machine is carried by a first blank mould carrier structure 40 and the three other blank mould halves 1b are carried by a second blank mould carrier structure 42. (shown in FIG. 1). Each blank mould carrier structure 40 or 42 moves in a direction at right angles to the longitudinal axis X—X of the machine, in a manner similar to the movement of the mould carrier 10, 12, 13, 14 at the blow station C. This movement of the structures 40, 42 serves to open or close the blank moulds 1.

FIG. 5 shows the left-hand end of FIG. 1 with a cover 43 thereof cut away. The mould carrier structure 42 (FIG. 1) is attached to a sliding member 44 which is movable along a guide rod 45 spanning the machine transversely, i.e. at right angles to the longitudinal axis X—X, by pneumatic piston and cylinder device located at a lower level in the blank station A and therefore not visible in FIG. 5. The sliding member 44 carries an extension 46 terminating in a cylindrical guide sleeve 47 which slides along a stationary rod 48 to assist in guiding the transverse movement of the sliding member 44 along its guide rods 45. The movable sliding member 44 carries a bracket 49 and the adjacent portion of the frame of the machine has attached thereto a block 50. Transverse movement of the sliding member 44 is sensed by a linear variable transformer 52 similar to the transformer 30 previously described. The transformer 52 of FIG. 5 has a body 53 mounted within the block 50 and a core 54 consisting of a ferromagnetic material attached to the bracket 49. As a result, the output voltage of the transformer 52 is representative of the position of the blank mould halves 1b.

The mould carrier structure 40 carrying the blank mould halves 1a is attached to a further sliding member movable on a further transverse guide rod, the further sliding member and the further guide rod being largely hidden by the sliding member 44 in FIG. 5. It will be appreciated that a single pneumatic piston and cylinder device is used to drive the sliding member 44 and a further sliding member so that these two sliding members move in mutually opposite directions to cause opening or closing movement of the blank moulds 1 at station A. FIG. 1 shows the position of the sliding member 44 when the blank moulds 1 are open, the transformer core 54 being outside the body 53, and FIG. 5 shows the position of the sliding member 44 when the blank moulds are closed, the core 54 being disposed within the body 53 of the transformer 52.

Figure 6:
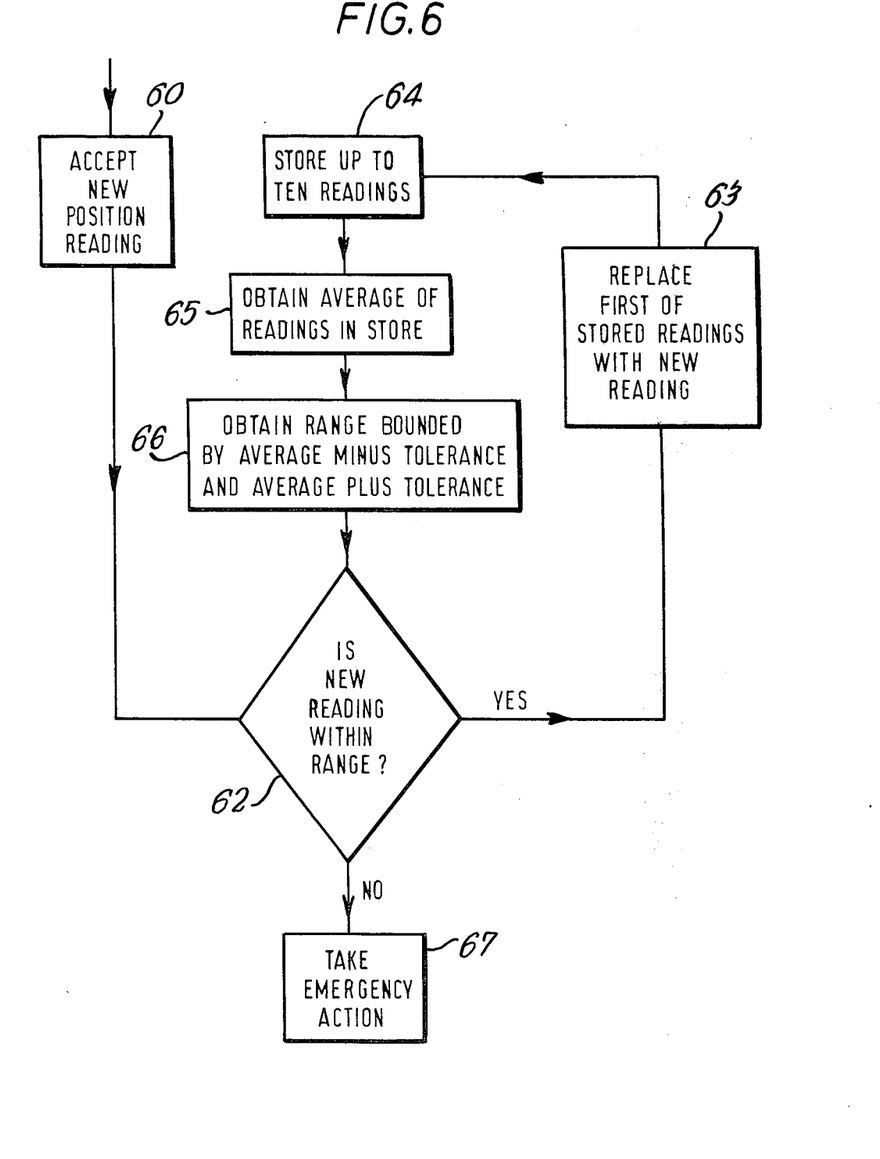
FIG. 6 is a logic circuit diagram explaining the operation of electrical processing circuitry of the machine.

The signals obtained from the transformer 52 are fed to the computer and are processed in a similar manner to that already described. FIG. 6 is a logic circuit diagram showing the logic steps undertaken by the computer in processing the electrical signal from the transformer 30 or 52. Block 60 indicates acceptance of a new position reading from the transformer 30 or 52, this being the transformer voltage sampled at the moment of closure of the blow moulds in the case of the transformer 30, or the transformer voltage at the moment of closure of the blank moulds in the case of the transformer 52. The newly sampled position reading is fed into a decision block 62 which decides whether the newly sampled position reading is within the range of acceptability. If the newly sampled position reading is within the range of acceptability, the reading is accepted as a new reading to replace the first of the ten stored readings held within the arithmetic storage unit, indicated by the block 63. The block 64 represents the step of storing up to ten readings, block 65 represents the step of obtaining the average of the readings in the storage unit, and block 66 indicates the step of obtaining the range of acceptability. The lower limit of the range of acceptability is the average obtained in the block 65 minus a predetermined tolerance and the upper limit of the range of acceptability is the average obtained in block 65 plus the predetermined tolerance. The range of acceptability obtained by the block 66 is used by the block 62 in making its decision.

If the newly sampled reading is outside the range of acceptability, emergency action is taken as indicated by the block 67. In the event of emergency action being taken as a result of a sample signal from the transformer 30 lying outside the range of acceptability, the emergency action may take the form of inhibiting further shaping of articles of glassware at the blow station C whilst allowing the continued formation of parisons at the blank station A, these parisons being transferred to the intermediate station B and dropped there as cullet. In the event of a signal from the transformer 52 falling outside the range of acceptability, the blank side of the machine may be shut down by interrupting the supply of gobs to the blank station A whilst keeping the transfer carriage reciprocating ready to accept parisons at the intermediate station B on recommencement of the production of parisons at the blank station A.

Although the present invention has been described with reference to an individual section of a multiple section glassware forming machine which has three stations spaced apart longitudinally of the machine, the invention may also be applied to conventional I.S. machines in which the parison is formed in an inverted position and transferred directly from the blank station to the blow station. In the case of the conventional I.S. machine, the emergency action will consist of an emergency stop of the machine.

It will be apparent that other forms of transducer, may be employed as the position sensitive device instead of the transformers 30, 52. It will also be apparent that the invention may be applied to moulds having mould parts which are moved in an arcuate path to close the mould.

I claim:

1. A method of monitoring the closing action of a mould (1, 7, 8, 9) of a glassware forming machine in a cyclic process of forming glassware, the method comprising producing a signal representative of the position of a part of the mould (1a, 7b, 8b, 9b) at a time in the cyclic process when the mould (1, 7, 8, 9) should be closed and comparing the signal with a signal representative of the position of the mould part (1b, 7b, 8b, 9b) when the mould is correctly closed, characterised in that the signal representative of the position of the mould part (1b, 7b, 8b, 9b) when the mould (1, 7, 8, 9) is closed is produced by averaging a selected number of the immediately preceding signals representative of the position of the part of the mould at the time when the mould should be closed.

2. Apparatus for use in monitoring the closing action of a mould (1, 7, 8, 9) of a cyclicly-operating glassware forming machine, the apparatus comprising a position sensitive device (30, 52) operable to produce a signal representative of the position of a part of the mould (1b, 7b, 8b, 9b), producing means (63, 64, 65) operable to produce a signal representative of the position of the mould part when the mould is correctly closed, and comparing means (62) operable to compare the signals produced by the position sensitive device (30, 52) and the producing means (63, 64, 65) at a time in the cyclic operation of the machine when the mould (1, 7, 8, 9) should be closed, characterised in that the producing means (63, 64, 65) produces its signal by averaging a selected number of immediately preceding signals of the position sensitive device (30, 52).

3. Apparatus according to claim 2, characterised in that, in the event that the signals of the position sensitive device (30, 52) and the producing means (63, 64, 65) are not within a predetermined tolerance of one another, the comparing means (62) is operative to produce an emergency action signal.

4. Apparatus according to claim 3, characterised in that preventing means (67) is operative, when an emergency action signal is produced, to prevent formation of further articles of glassware.

5. Apparatus according to any one of claims 2, 3 or 4, characterised in that the position sensitive device (30, 52) is only operable to produce a signal when the mould part (1b, 7b, 8b, 9b) is within a predetermined tolerance of its position when the mould (1, 7, 8, 9) is correctly closed.

6. Apparatus according to claim 5, characterised in that the position sensitive device (30, 52) is a linear variable transformer having a movable core (34, 54) of ferromagnetic material movable between two sensitive coils.

7. Apparatus according to claim 6, characterised in that the core (34, 54) of the linear variable transformer (30, 52) comprises a section of ferromagnetic material (34b) located between two sections of non-ferromagnetic material (34a, 34c).

8. Apparatus according to claim 5, characterised in that the producing means (63, 64, 65) produces its signal by averaging the immediately previous ten signals of the position sensitive device (30, 52), or, if there are less than ten sets of signals, by averaging all the previous signals on the device (30, 52).

9. Apparatus according to claim 5, characterised in that the position sensitive device (30, 52) is located between drive means (15) of the glassware forming machine operable to close the mould (7, 8, 9) and equalising means (24, 25) of the glassware forming machine operable to equalise the mould closing forces between a plurality of moulds (7, 8, 9) of the machine.

* * * * *